(12) United States Patent
Lee et al.

(10) Patent No.: US 12,533,791 B2
(45) Date of Patent: Jan. 27, 2026

(54) ROBOT

(71) Applicant: LG ELECTRONICS INC., Seoul (KR)

(72) Inventors: Haklim Lee, Seoul (KR); Jiyong Shin, Seoul (KR); Sanghyuk Im, Seoul (KR)

(73) Assignee: BEAR ROBOTICS KOREA, INC., Seoul (KR)

( * ) Notice: Subject to any disclaimer, the term of this patent is extended or adjusted under 35 U.S.C. 154(b) by 445 days.

(21) Appl. No.: 18/041,588

(22) PCT Filed: Aug. 19, 2020

(86) PCT No.: PCT/KR2020/011025
§ 371 (c)(1),
(2) Date: Feb. 14, 2023

(87) PCT Pub. No.: WO2022/039293
PCT Pub. Date: Feb. 24, 2022

(65) Prior Publication Data
US 2023/0286131 A1    Sep. 14, 2023

(51) Int. Cl.
*B25J 5/00*   (2006.01)
*B25J 9/00*   (2006.01)
*B25J 19/00*  (2006.01)

(52) U.S. Cl.
CPC ............ *B25J 5/007* (2013.01); *B25J 9/0009* (2013.01); *B25J 19/005* (2013.01)

(58) Field of Classification Search
CPC ......... B25J 5/007; B25J 9/0009; B25J 19/005
See application file for complete search history.

(56) References Cited

U.S. PATENT DOCUMENTS 3,689,103 A * 9/1972 Meulendyk ............ B60G 17/04
                                                                180/41
7,665,585 B2 * 2/2010 Alexandridis ..... B60G 17/0152
                                                                248/562

(Continued)

FOREIGN PATENT DOCUMENTS

CN      210121862 U  *  3/2020
JP      2016-224654        12/2016

(Continued)

OTHER PUBLICATIONS

Machine translation of KR 102041435 B1 obtained on Jul. 1, 2025.*
PCT International Application No. PCT/KR2020/011025, International Search Report dated May 3, 2021, 5 page.

*Primary Examiner* — Adam D Rogers
(74) *Attorney, Agent, or Firm* — Birch, Stewart, Kolasch & Birch, LLP

(57) ABSTRACT

A robot includes a base, a driving wheel protruding downward from the base, a plurality of lower pillars extending upward from the base, an upper module supported by the plurality of lower pillars, and a suspension coupled to at least one lower pillar of the plurality of lower pillars and being coupled to the driving wheel. The suspension may include a slider configured to move upward and downward while sliding along the at least one lower pillar, a spring disposed relative to an outer circumference of the lower pillar and being positioned to provide a force that causes the slider to move downward, a suspension arm coupled to the slider and a rotational shaft of the driving wheel, a connector coupled to the base, and a rotational shaft of the suspension arm being coupled to the connector.

19 Claims, 15 Drawing Sheets

(56) References Cited

U.S. PATENT DOCUMENTS

| | | | | |
|---|---|---|---|---|
| 7,721,829 | B2 * | 5/2010 | Lee | B62D 61/12 |
| | | | | 180/6.48 |
| 10,759,045 | B2 * | 9/2020 | Yang | B25J 11/008 |
| 11,472,500 | B2 * | 10/2022 | Amacker | B62D 15/00 |
| 12,054,022 | B2 * | 8/2024 | Lee | B60G 17/0157 |
| 2023/0310683 | A1 * | 10/2023 | Lee | B25J 9/16 |
| | | | | 250/492.1 |
| 2024/0017580 | A1 * | 1/2024 | Lee | B60K 7/0007 |

FOREIGN PATENT DOCUMENTS

| | | | | |
|---|---|---|---|---|
| KR | 10-2008-0028220 | | 3/2008 | |
| KR | 10-2011-0088045 | | 8/2011 | |
| KR | 10-2013-0045291 | | 5/2013 | |
| KR | 10-2014-0076351 | | 6/2014 | |
| KR | 102041435 B1 * | 11/2019 | | B25J 19/0054 |
| KR | 20200025102 A * | 3/2020 | | B25J 19/0091 |
| KR | 102642621 B1 * | 3/2024 | | B25J 11/008 |
| KR | 102855861 B1 * | 9/2025 | | B60G 7/001 |
| WO | WO-2014092304 A1 * | 6/2014 | | B25J 5/00 |
| WO | WO-2023191125 A1 * | 10/2023 | | B60B 33/045 |
| WO | WO-2025018434 A1 * | 1/2025 | | B60G 11/14 |

* cited by examiner

[FIG. 1]
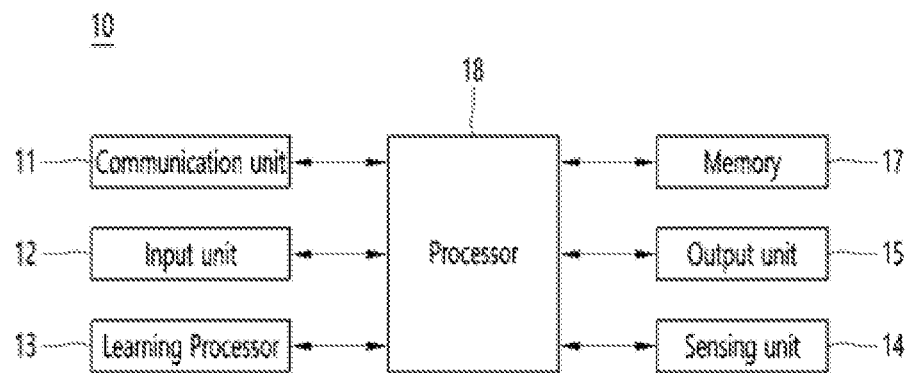
[FIG. 2]
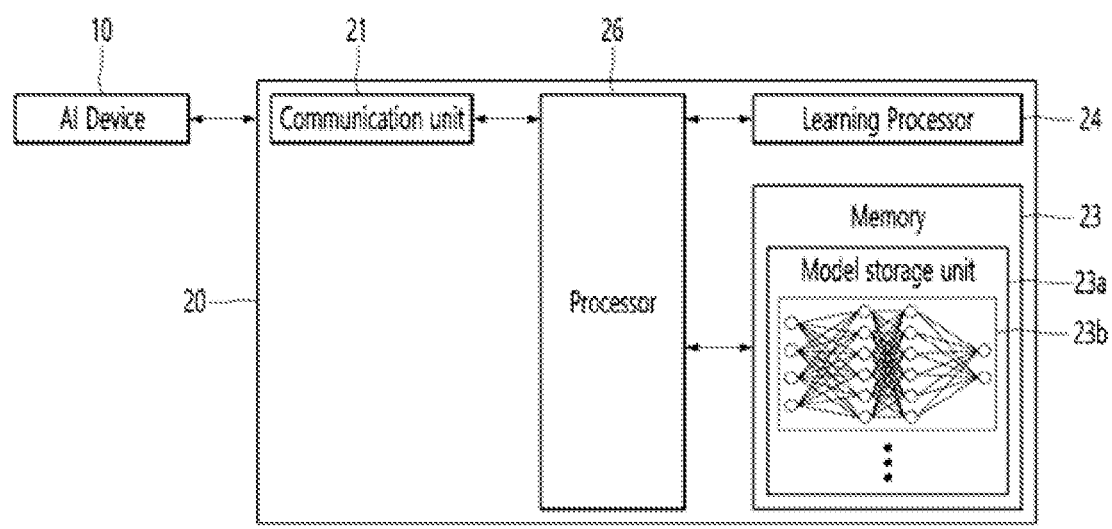

[FIG. 3]
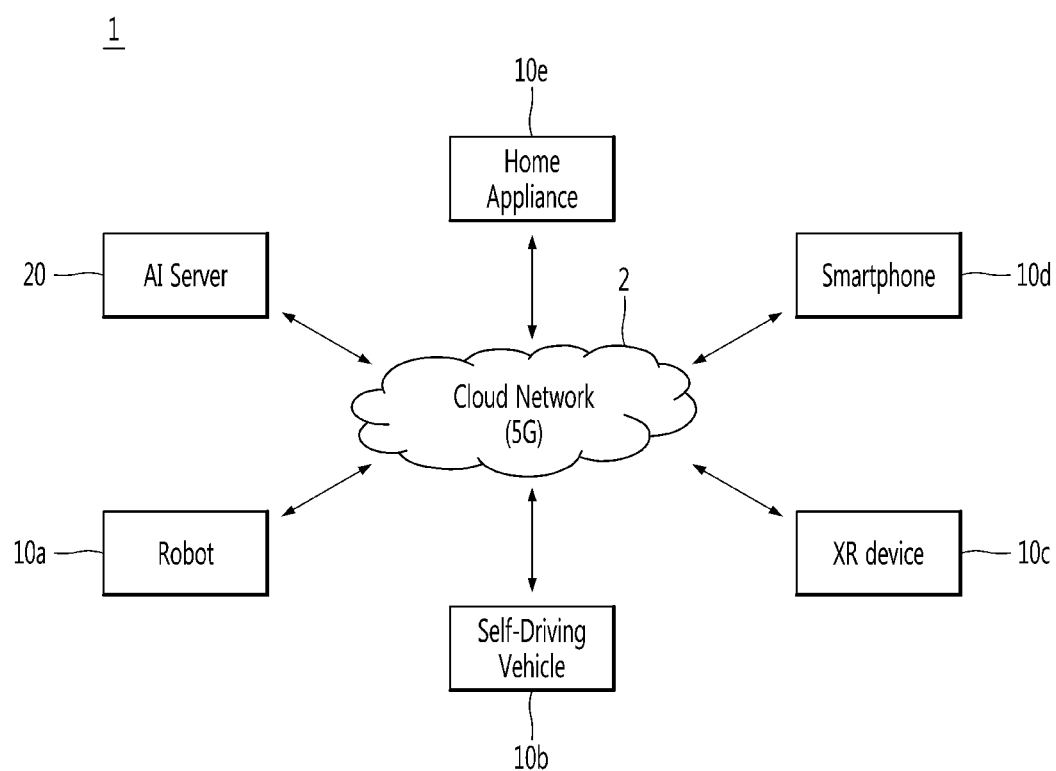

[FIG. 4]
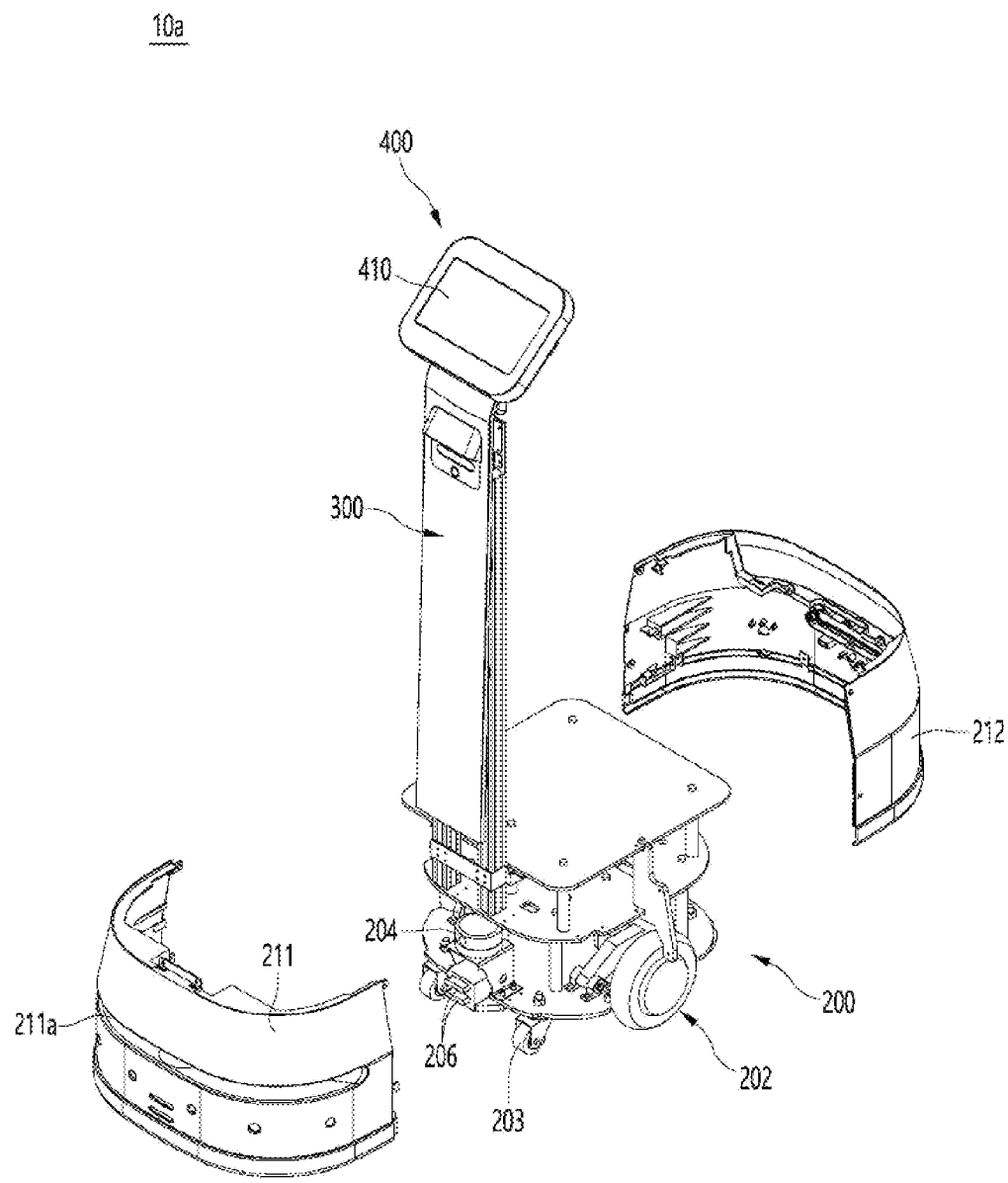

[FIG. 5]
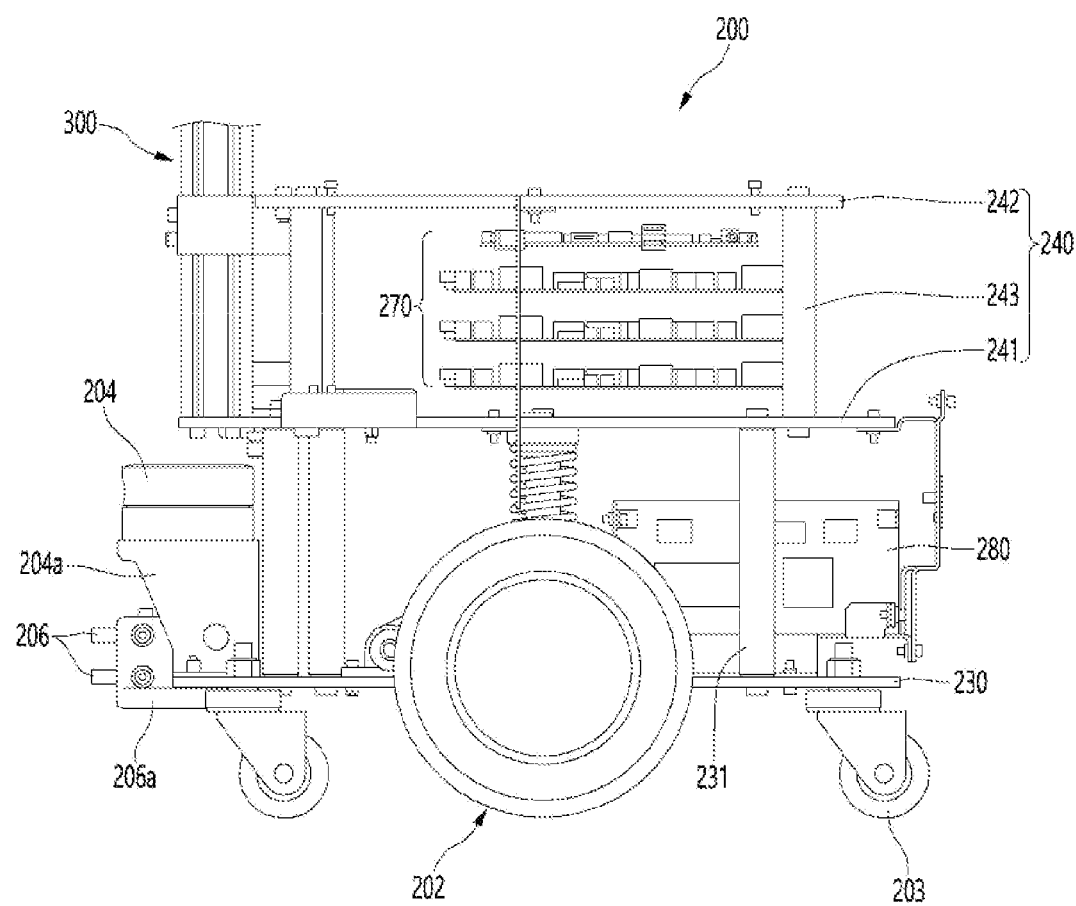

[FIG. 6]
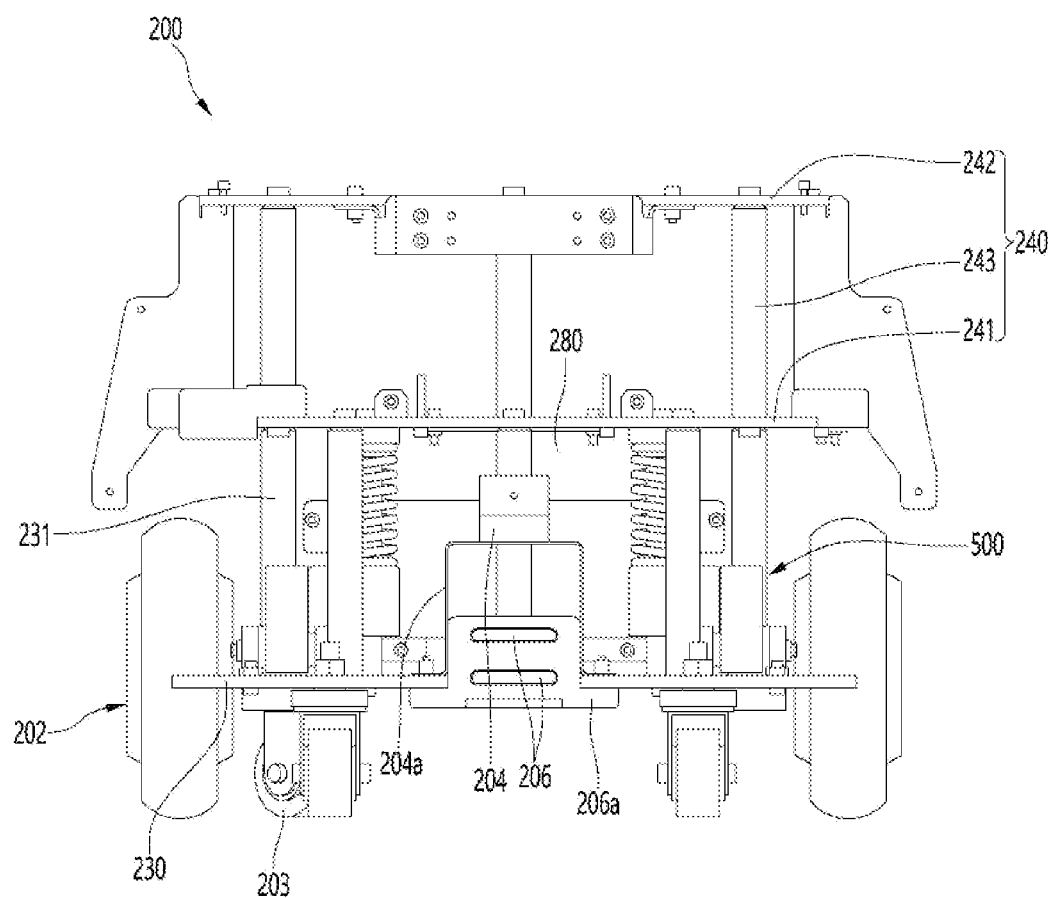

[FIG. 7]
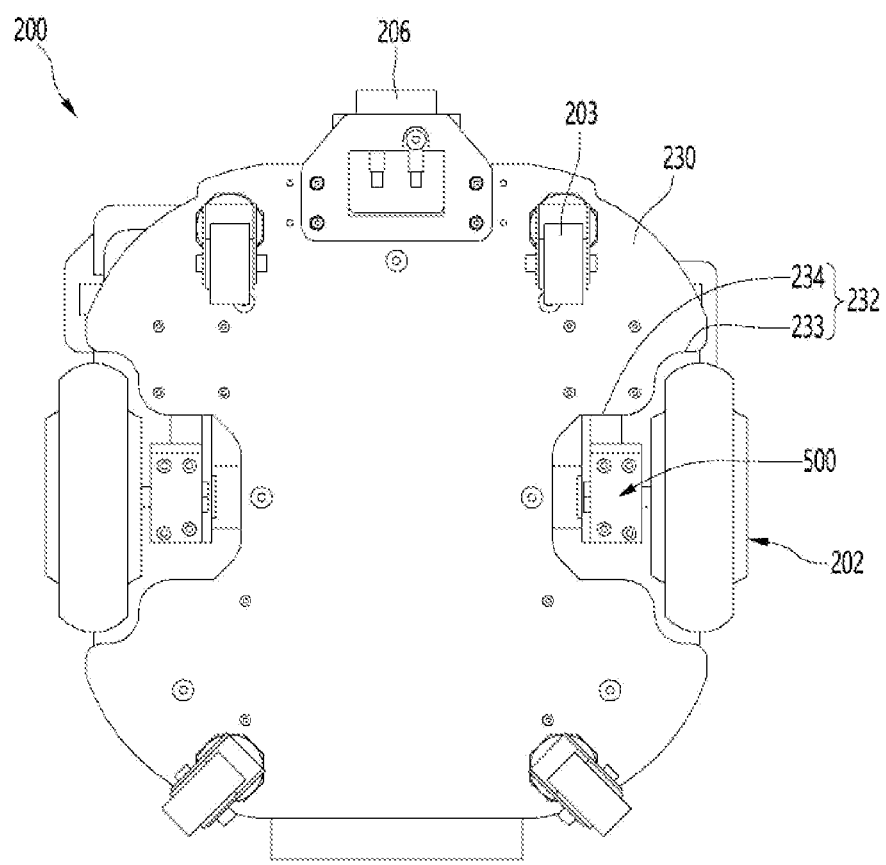

[FIG. 8]
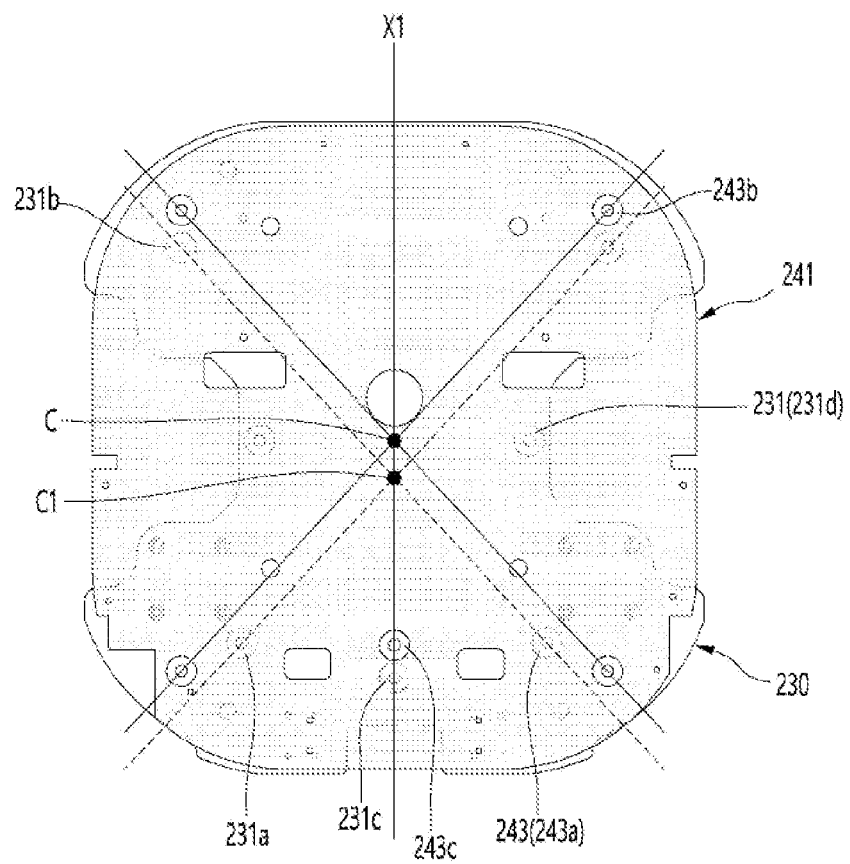

[FIG. 9]
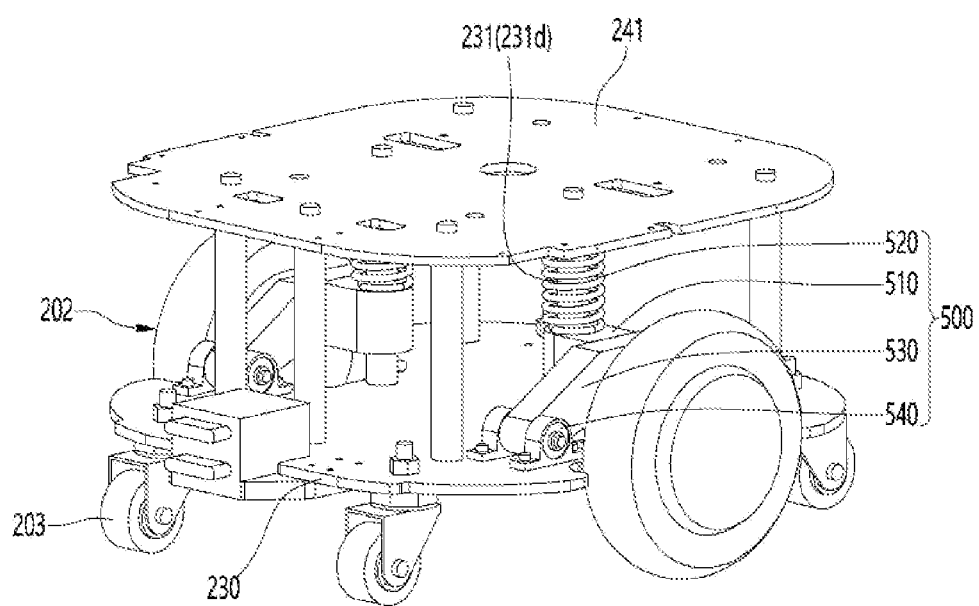

[FIG. 10]
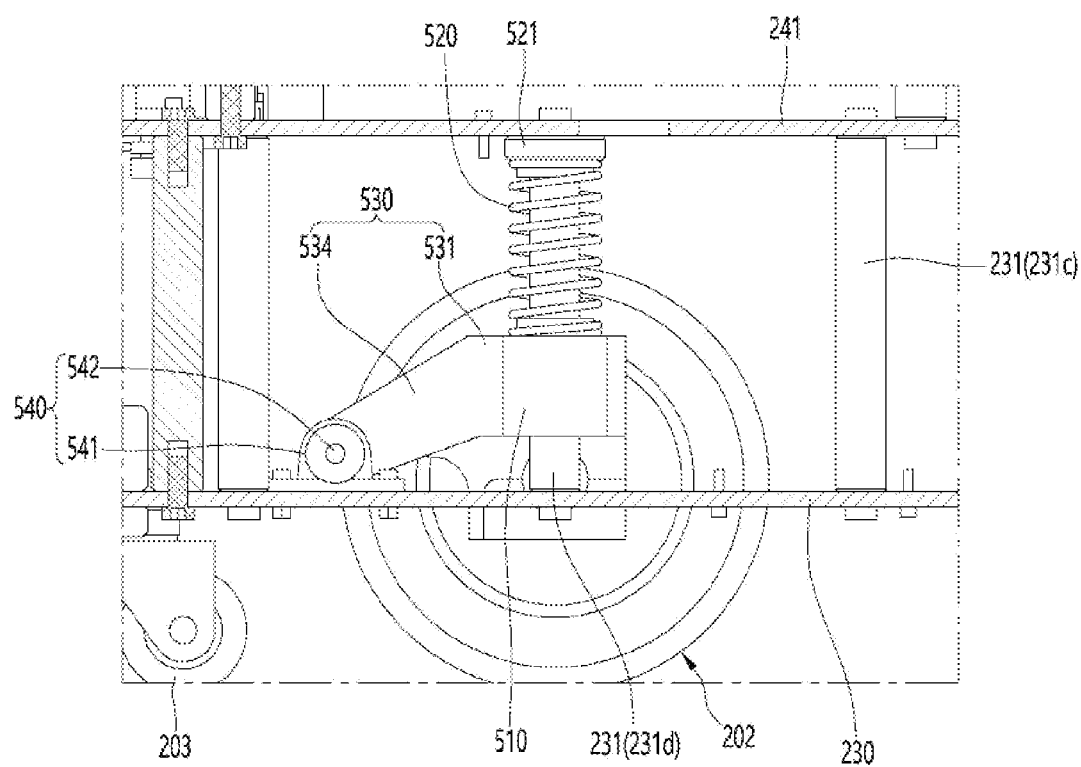

[FIG. 11]
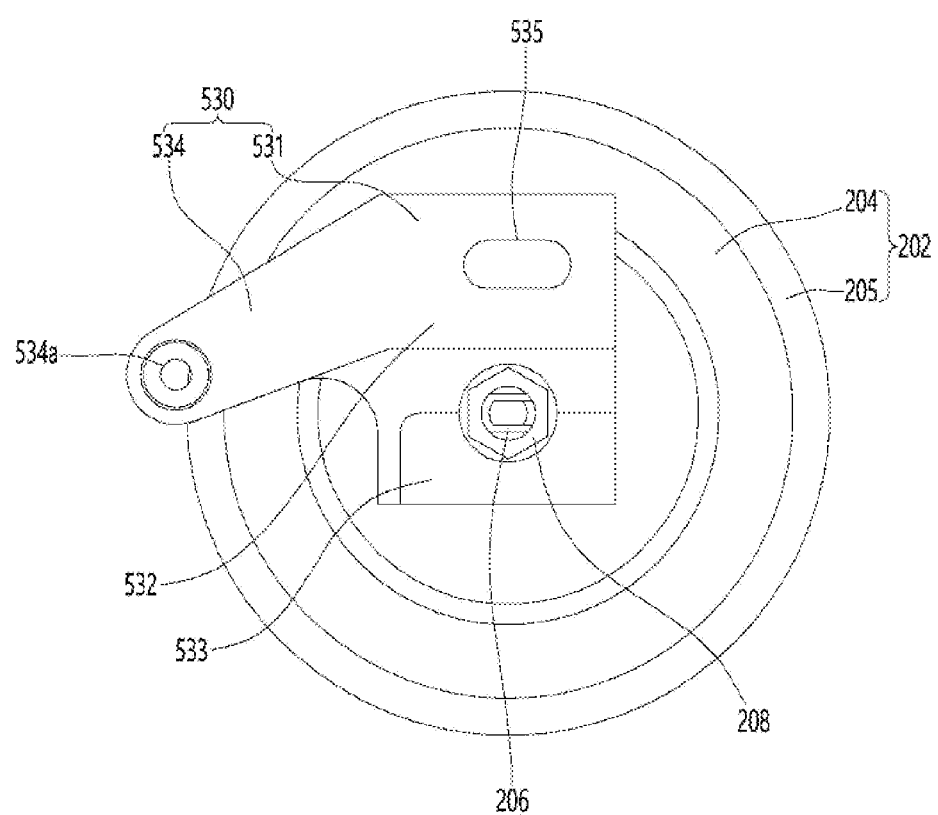

[FIG. 12]
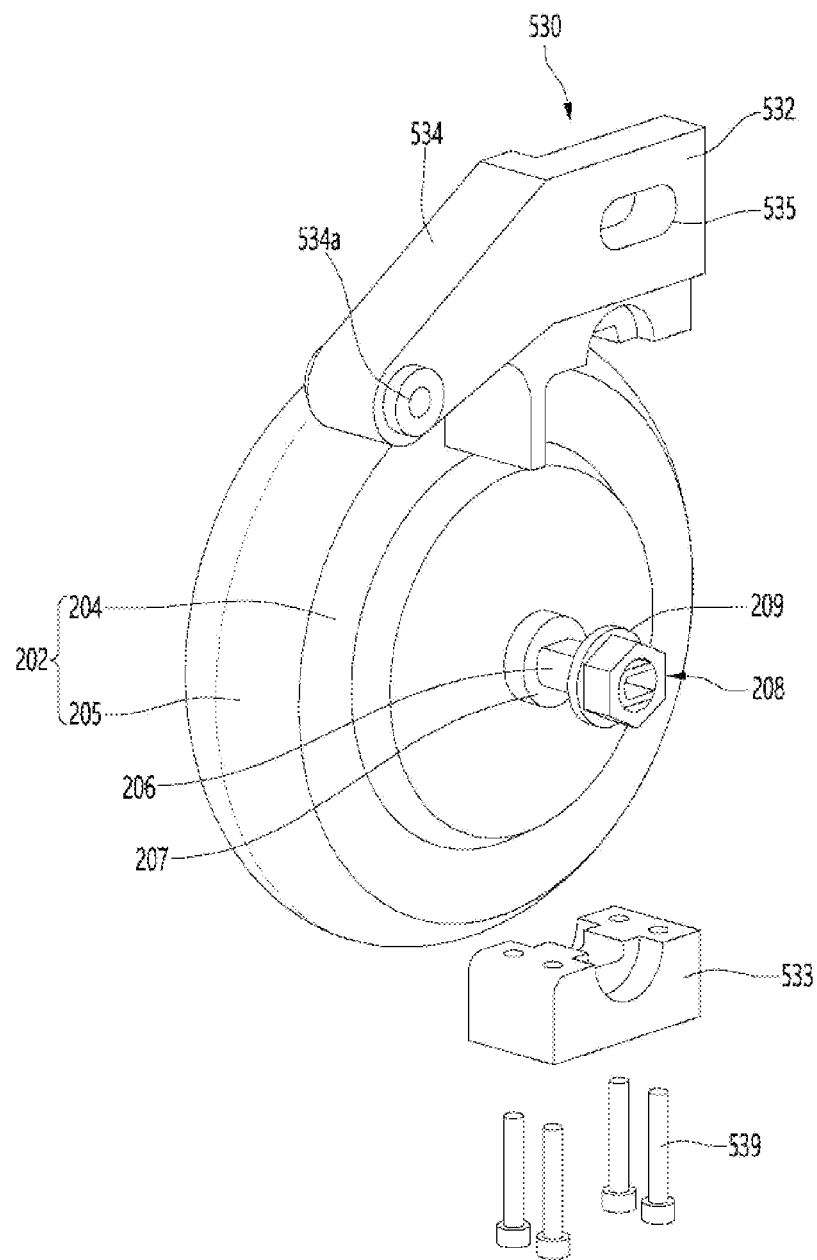

[FIG. 13]
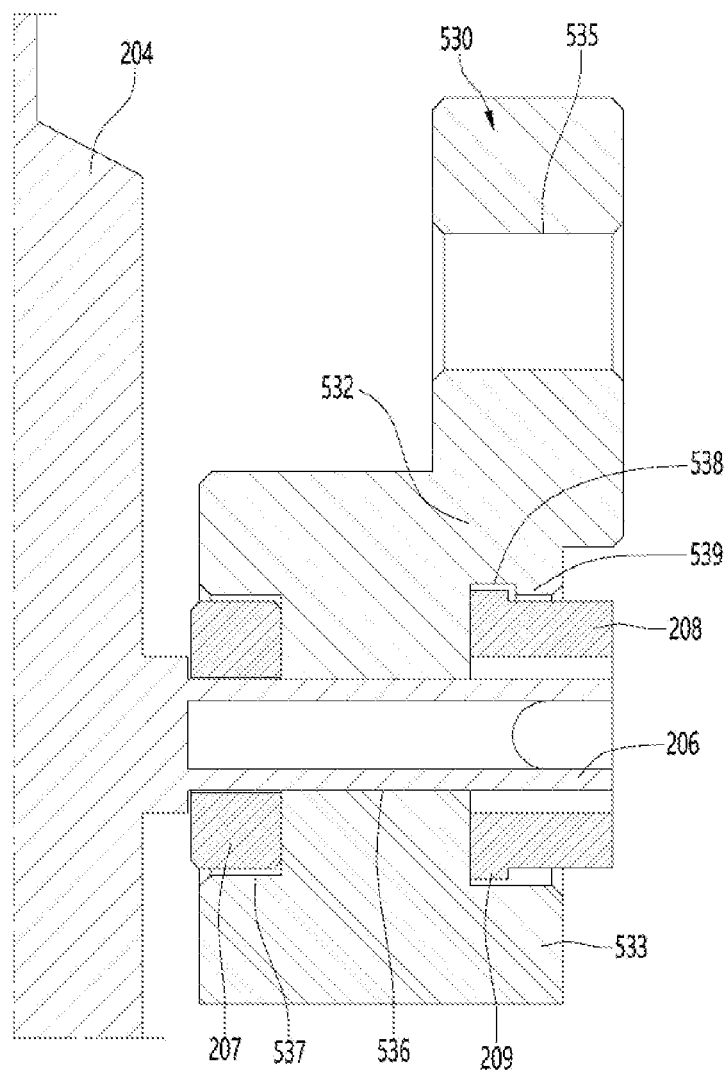

[FIG. 14]
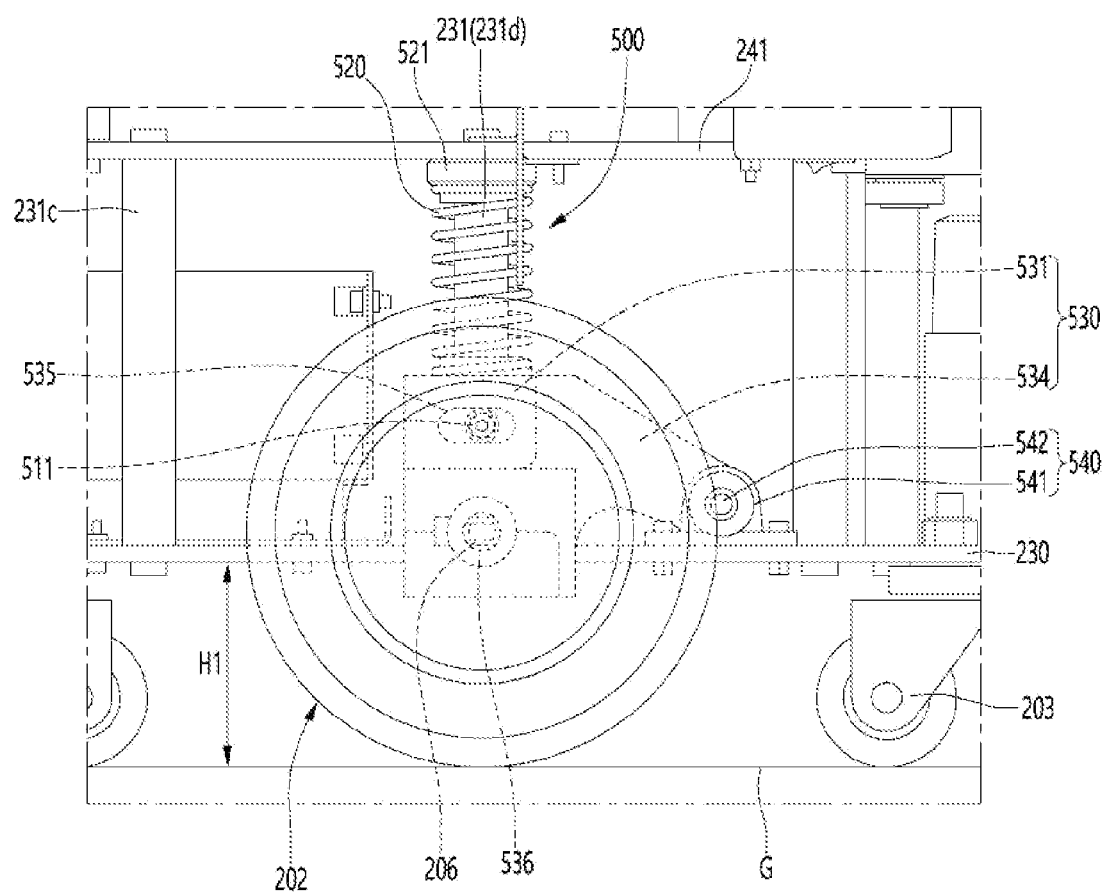

[FIG. 15]
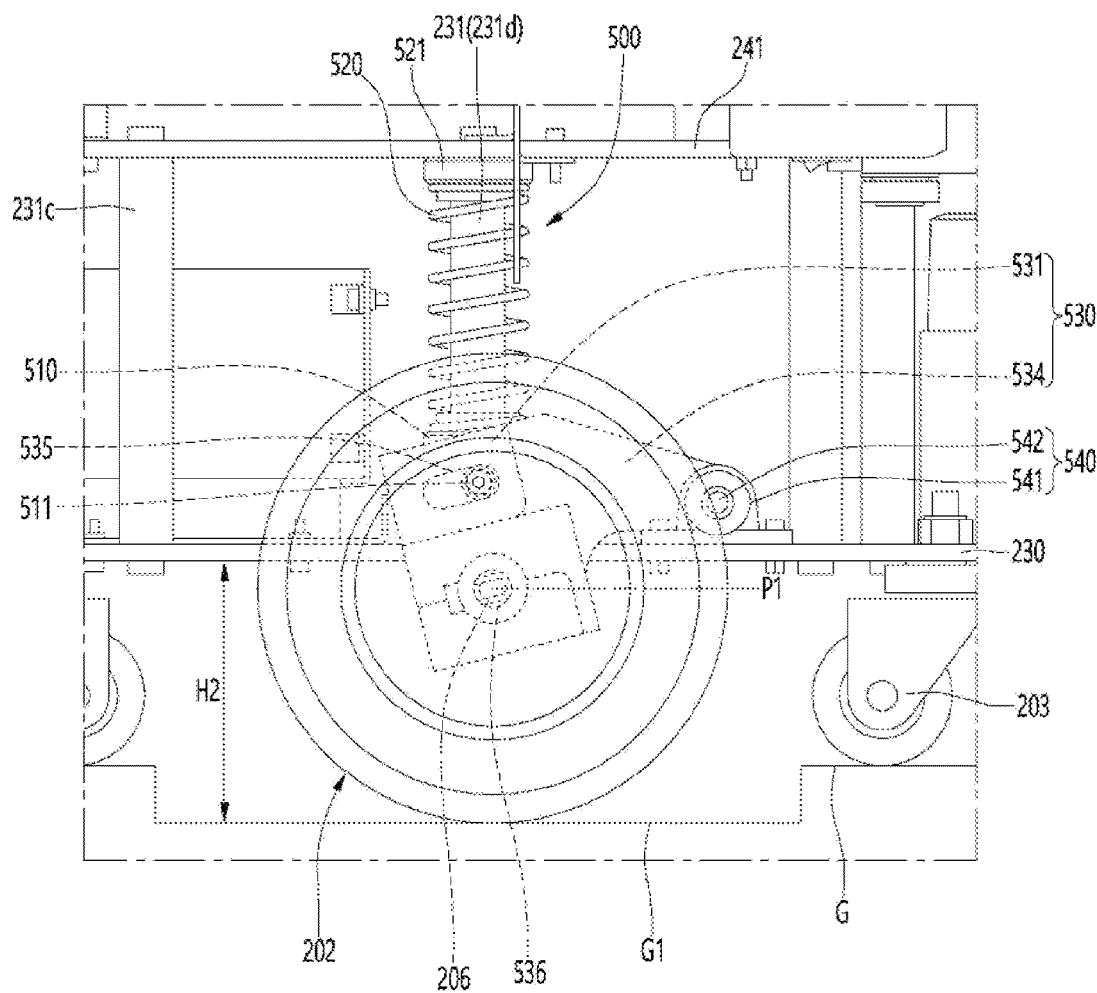

[FIG. 16]
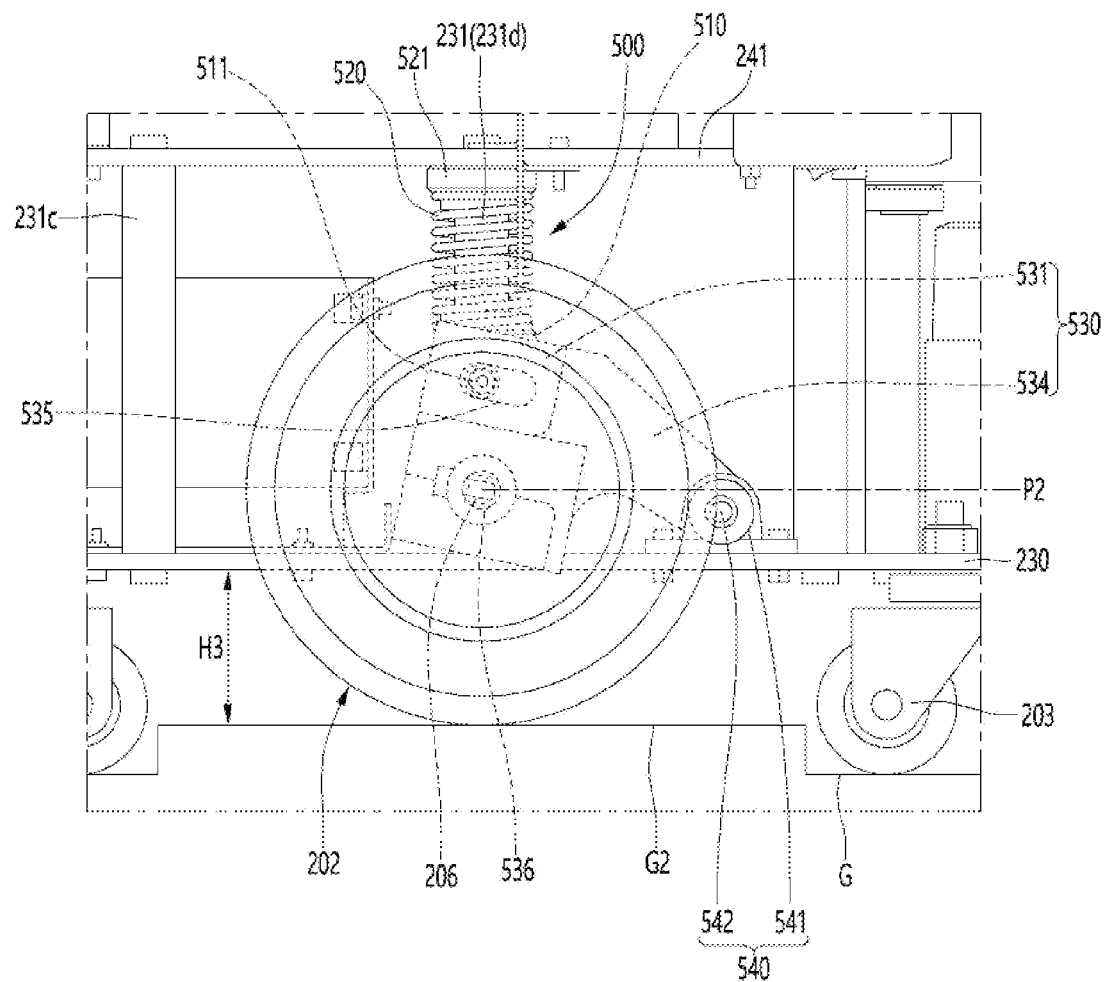

ROBOT

CROSS-REFERENCE TO RELATED APPLICATION(S)

This application is the National Stage filing under 35 U.S.C. 371 of International Application No. PCT/KR2020/011025, filed on Aug. 19, 2020, the contents of which is hereby incorporated by reference herein in its entirety.

TECHNICAL FIELD

The present disclosure relates to a robot capable of autonomous driving.

BACKGROUND ART

In order to take on a part of factory automation, robots have been developed for industrial use. In recent years, the field of application of robots has been further expanded, and not only medical robots and aerospace robots, but also robots that can be used in daily life are being developed.

These robots for everyday life provide specific services (e.g., shopping, serving, talking, cleaning, etc.) in response to a user's command.

However, existing robots for everyday life are designed to provide only specific services, and thus there is a problem in that utilization is not high, compared to the cost invested in developing the robots.

Accordingly, the need for a robot capable of providing various services has recently emerged.

In particular, a robot capable of autonomous driving may provide various services while traveling within a set space. However, it is common to design conventional robots to have individual structures according to the type of service or driving purpose. Therefore, there is a problem in that the technical difficulty is high and the development and manufacturing costs are increased.

DISCLOSURE OF INVENTION

Technical Problem

An object of the present disclosure is to provide a robot having a configuration commonly applicable to various types of mobile devices.

Another object of the present disclosure is to provide a robot capable of traveling while being stable and minimizing shaking.

Technical Solution

A robot according to an embodiment of the present disclosure may include: a base; a driving wheel protruding downward from the base; a plurality of lower pillars extending upward from the base; an upper module supported by the plurality of lower pillars; and a suspension provided on at least one of the plurality of lower pillars and connected to the driving wheel. The suspension may include: a slider configured to move upward and downward while sliding along the lower pillar; a spring disposed on an outer circumference of the lower pillar to press the slider downward; a suspension arm to which the slider and a rotational shaft of the driving wheel are connected; and a connector fastened to the base and to which a rotational shaft of the suspension arm is connected.

The driving wheel may move upward and downward between a first position in which the rotational shaft of the driving wheel is located below the base and a second position in which the rotational shaft of the driving wheel is located above the base.

A vertical length of the spring may be greater than half of a vertical length of the lower pillar when the driving wheel is in the first position, and may be less than half of the vertical length of the lower pillar when the driving wheel is in the second position.

A cutout may be formed in the base so as to prevent interference between the suspension and the base when the driving wheel moves upward and downward.

The slider may be located on one side of the suspension arm, and the driving wheel may be located on the other side of the suspension arm.

The suspension arm may include: a body portion to which the slider and the driving wheel are connected; and an arm portion extending from the body portion so as to be connected to the connector.

The arm portion may extend in an oblique direction so that a height of the arm portion may decrease as a distance from the body portion increases.

An elongated hole may be formed in one direction in the suspension arm, and the slider may be provided with a protruding pin inserted into the elongated hole and moving between both ends of the elongated hole when the slider moves upward and downward.

The suspension arm may include: a first recessed portion facing the driving wheel; a second recessed portion located on an opposite side of the first recessed portion; and a through-hole penetrating from the first recessed portion to the second recessed portion and through which the rotational shaft of the driving wheel passes. The rotational shaft of the driving wheel may include: a flange, at least a portion of which is located within the first recessed portion; and a fastening member, at least a portion of which is located within the second recessed portion.

The suspension arm may include a pair of parts fastened to each other. A portion of each of the first recessed portion, the second recessed portion, and the through-hole may be formed in one of the pair of parts, and another portion of each of the first recessed portion, the second recessed portion, and the through-hole may be formed in the other of the pair of parts.

A stepped portion may be formed on an inner circumference of the second recessed portion in a radially inward direction, and the fastening member may be provided with an expansion portion constrained to the stepped portion with respect to a direction of the rotational shaft of the driving wheel.

The robot may further include a battery disposed between the base and the upper module.

The plurality of lower pillars may include at least one pair of pillars disposed symmetrically with each other with respect to a vertical axis passing through a center of gravity of the robot or a point adjacent to the center of gravity of the robot.

The plurality of lower pillars may be disposed closer to an edge of the base than a center of the base.

The upper module may include: a plurality of plates spaced in parallel to each other in a vertical direction; and a plurality of upper pillars disposed between the plurality of plates.

A robot according to an embodiment of the present disclosure may include: a base; a driving wheel protruding downward from the base; a plurality of lower pillars extending upward from the base; an upper module supported by the plurality of lower pillars; and a suspension provided on at least one of the plurality of lower pillars and connected to the driving wheel. The upper module may include: a plurality of plates spaced in parallel to each other in a vertical direction; and a plurality of upper pillars disposed between the plurality of plates.

Each of the plurality of lower pillars and the plurality of upper pillars may include at least one pair of pillars disposed symmetrically with each other with respect to a vertical axis passing through a center of gravity of the robot or a point adjacent to the center of gravity of the robot.

The plurality of lower pillars may be disposed closer to an edge of the base than a center of the base, and the plurality of upper pillars may be disposed closer to an edge of the plate than a center of the plate.

Upper ends of the plurality of lower pillars may be adjacent to lower ends of the plurality of upper pillars.

The robot may further include: a battery disposed between the base and the upper module; and at least one substrate disposed inside the upper module.

Advantageous Effects

According to a preferred embodiment of the present disclosure, a design of a robot may be easily changed to suit various purposes by varying only the number of plates included in an upper module and a vertical height between the plates. That is, there is an advantage that the robot according to the present disclosure may be commonly applied to various types of mobile devices.

In addition, by applying a flat plate structure to the robot, a wide internal space may be secured and vibration generated during traveling may be reduced.

In addition, a plurality of pillars may be disposed adjacent to the edge of the robot, and upper ends of the lower pillars and lower ends of the upper pillars may be disposed adjacent to each other. Therefore, the load may be easily transmitted while the load is widely distributed to the upper pillar and the lower pillar.

In addition, the plurality of pillars may be disposed such that diagonal intersections between the plurality of pillars do not deviate greatly from the center of gravity of the robot. Accordingly, the rotational moment generated during traveling may be minimized, and the robot may travel more stably.

In addition, since a relatively heavy battery is disposed on the lower side of the upper module, the height of the center of gravity of the robot is lowered, thereby enabling stable traveling.

In addition, since a suspension is directly installed on the lower pillar supporting the upper module rather than a separate shaft, additional components are not required, and thus, a sufficiently long stroke of the suspension may be secured. Therefore, the robot may easily travel even with respect to a floor or an obstacle having a slightly large step.

In addition, since the lower pillar on which the suspension is installed may support the load and also acts as a suspension mounter, there is an advantage in that the structure is simplified and the cost is reduced.

In addition, a driving wheel may move upward and downward between a first position in which a rotational shaft is located below the base and a second position located above the base. Therefore, a sufficiently long stroke of the suspension may be secured.

In addition, a cutout formed in the base allows the suspension arm to rotate easily without interfering with the base, and the robot may be compact.

In addition, the slider may be located on one side of the suspension arm, and the driving wheel may be located on the other side of the suspension arm. This may lower the overall height of the suspension and may secure a sufficiently long stroke.

In addition, an arm portion of the suspension arm may extend in an inclined direction in which the height decreases as the distance from the body portion increases. Therefore, even when the suspension arm rotates downward, the arm portion may be located above the base, and the suspension arm may smoothly rotate without interfering with the base.

In addition, it is possible to prevent the driving wheel from being shaken or separated from the suspension arm in the direction of the rotational shaft of the driving wheel by a flange and a fastening member provided on the rotational shaft of the driving wheel and first and second recessed portions formed in the suspension arm.

Furthermore, a portion of each of the first and second recessed portions and a through-hole may be formed in one part of the suspension arm, and the other portion thereof may be formed in the other part of the suspension arm. Therefore, connection and separation of the suspension arm with respect to the rotational shaft of the driving wheel may be facilitated.

In addition, it is possible to prevent the fastening member from being separated from the second recessed portion by an expansion portion formed in the fastening member and a stepped portion formed in the inner circumference of the second recessed portion.

BRIEF DESCRIPTION OF DRAWINGS

FIG. 1 illustrates an artificial intelligence (AI) device including a robot according to an embodiment of the present disclosure.

FIG. 2 illustrates an AI server connected to a robot according to an embodiment of the present disclosure.

FIG. 3 illustrates an AI system according to an embodiment of the present disclosure.

FIG. 4 is an exploded perspective view of a robot according to an embodiment of the present disclosure.

FIG. 5 is a side view of a main body of the robot according to an embodiment of the present disclosure.

FIG. 6 is a front view of the main body of the robot according to an embodiment of the present disclosure.

FIG. 7 is a bottom view of the main body of the robot according to an embodiment of the present disclosure.

FIG. 8 is a view for describing the positions of a plurality of lower pillars and a plurality of upper pillars according to an embodiment of the present disclosure.

FIG. 9 is a view illustrating a suspension according to an embodiment of the present disclosure.

FIG. 10 is a view of the suspension when viewed from the inside of the main body, according to an embodiment of the present disclosure.

FIGS. 11 to 13 are views for describing a connection between a suspension arm and a driving wheel according to an embodiment of the present disclosure.

FIGS. 14 to 16 are views for describing the operation of the suspension according to the embodiment of the present disclosure.

MODE OF DISCLOSURE

Hereinafter, detailed embodiments will be described in detail with reference to the accompanying drawings.

Hereinafter, an expression "an element is "coupled" or "connected" to another element" may means that the two elements are directly coupled or connected to each other, or may mean that a third element is present between the two elements and the two elements are coupled or connected to each other by the third element. On the other hand, when it is described that one element is "directly coupled" or "directly connected" to another element, it may be understood that a third element is not present between the two elements.

<Robot>

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving unit may include an actuator or a motor and may perform various physical operations such as moving a robot joint. In addition, a movable robot may include a wheel, a brake, a propeller, and the like in a driving unit, and may travel on the ground through the driving unit or fly in the air.

<Artificial Intelligence (AI)>

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for learning data is given, and the label may mean the correct answer (or result value) that the artificial neural network must infer when the learning data is input to the artificial neural network. The unsupervised learning may refer to a method of learning an artificial neural network in a state in which a label for learning data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep learning is part of machine learning. In the following, machine learning is used to mean deep learning.

<Self-Driving>

Self-driving refers to a technique of driving for oneself, and a self-driving vehicle refers to a vehicle that travels without an operation of a user or with a minimum operation of a user.

For example, the self-driving may include a technology for maintaining a lane while driving, a technology for automatically adjusting a speed, such as adaptive cruise control, a technique for automatically traveling along a predetermined route, and a technology for automatically setting and traveling a route when a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like.

At this time, the self-driving vehicle may be regarded as a robot having a self-driving function.

FIG. 1 illustrates an AI device 10 including a robot according to an embodiment of the present disclosure.

The AI device 10 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI device 10 may include a communicator 11, an input interface 12, a learning processor 13, a sensor 14, an output interface 15, a memory 17, and a processor 18.

The communicator 11 may transmit and receive data to and from external devices such as other AI devices 10a to 10e and the AI server 20 by using wire/wireless communication technology. For example, the communicator 11 may transmit and receive sensor information, a user input, a learning model, and a control signal to and from external devices.

The communication technology used by the communicator 11 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The input interface 12 may acquire various kinds of data.

At this time, the input interface 12 may include a camera for inputting a video signal, a microphone for receiving an audio signal, and a user input interface for receiving information from a user. The camera or the microphone may be treated as a sensor, and the signal acquired from the camera or the microphone may be referred to as sensing data or sensor information.

The input interface 12 may acquire a learning data for model learning and an input data to be used when an output is acquired by using learning model. The input interface 12 may acquire raw input data. In this case, the processor 18 or the learning processor 13 may extract an input feature by preprocessing the input data.

The learning processor 13 may learn a model composed of an artificial neural network by using learning data. The learned artificial neural network may be referred to as a learning model. The learning model may be used to an infer result value for new input data rather than learning data, and the inferred value may be used as a basis for determination to perform a certain operation.

At this time, the learning processor 13 may perform AI processing together with the learning processor 24 of the AI server 20.

At this time, the learning processor 13 may include a memory integrated or implemented in the AI device 10. Alternatively, the learning processor 13 may be implemented by using the memory 17, an external memory directly connected to the AI device 10, or a memory held in an external device.

The sensor 14 may acquire at least one of internal information about the AI device 10, ambient environment information about the AI device 10, and user information by using various sensors.

Examples of the sensors included in the sensor 14 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output interface 15 may generate an output related to a visual sense, an auditory sense, or a haptic sense.

At this time, the output interface 15 may include a display unit for outputting time information, a speaker for outputting auditory information, and a haptic module for outputting haptic information.

The memory 17 may store data that supports various functions of the AI device 10. For example, the memory 17 may store input data acquired by the input interface 12, learning data, a learning model, a learning history, and the like.

The processor 18 may determine at least one executable operation of the AI device 10 based on information determined or generated by using a data analysis algorithm or a machine learning algorithm. The processor 18 may control the components of the AI device 10 to execute the determined operation.

To this end, the processor 18 may request, search, receive, or utilize data of the learning processor 13 or the memory 17. The processor 18 may control the components of the AI device 10 to execute the predicted operation or the operation determined to be desirable among the at least one executable operation.

When the connection of an external device is required to perform the determined operation, the processor 18 may generate a control signal for controlling the external device and may transmit the generated control signal to the external device.

The processor 18 may acquire intention information for the user input and may determine the user's requirements based on the acquired intention information.

The processor 18 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 13, may be learned by the learning processor 24 of the AI server 20, or may be learned by their distributed processing.

The processor 18 may collect history information including the operation contents of the AI apparatus 100 or the user's feedback on the operation and may store the collected history information in the memory 17 or the learning processor 13 or transmit the collected history information to the external device such as the AI server 20. The collected history information may be used to update the learning model.

The processor 18 may control at least part of the components of AI device 10 so as to drive an application program stored in memory 17. Furthermore, the processor 18 may operate two or more of the components included in the AI device 10 in combination so as to drive the application program.

FIG. 2 illustrates an AI server 20 connected to a robot according to an embodiment of the present disclosure.

Referring to FIG. 2, the AI server 20 may refer to a device that learns an artificial neural network by using a machine learning algorithm or uses a learned artificial neural network. The AI server 20 may include a plurality of servers to perform distributed processing, or may be defined as a 5G network. At this time, the AI server 20 may be included as a partial configuration of the AI device 10, and may perform at least part of the AI processing together.

The AI server 20 may include a communicator 21, a memory 23, a learning processor 24, a processor 26, and the like.

The communicator 21 can transmit and receive data to and from an external device such as the AI device 10.

The memory 23 may include a model storage unit 23a. The model storage unit 23a may store a learning or learned model (or an artificial neural network 26b) through the learning processor 24.

The learning processor 24 may learn the artificial neural network 26b by using the learning data. The learning model may be used in a state of being mounted on the AI server 20 of the artificial neural network, or may be used in a state of being mounted on an external device such as the AI device 10.

The learning model may be implemented in hardware, software, or a combination of hardware and software. If all or part of the learning models are implemented in software, one or more instructions that constitute the learning model may be stored in memory 23.

The processor 26 may infer the result value for new input data by using the learning model and may generate a response or a control command based on the inferred result value.

FIG. 3 illustrates an AI system 1 according to an embodiment of the present disclosure.

Referring to FIG. 3, in the AI system 1, at least one of an AI server 20, a robot 10a, a self-driving vehicle 10b, an XR device 10c, a smartphone 10d, or a home appliance 10e is connected to a cloud network 2. The robot 10a, the self-driving vehicle 10b, the XR device 10c, the smartphone 10d, or the home appliance 10e, to which the AI technology is applied, may be referred to as AI devices 10a to 10e.

The cloud network 2 may refer to a network that forms part of a cloud computing infrastructure or exists in a cloud computing infrastructure. The cloud network 2 may be configured by using a 3G network, a 4G or LTE network, or a 5G network.

That is, the devices 10a to 10e and 20 configuring the AI system 1 may be connected to each other through the cloud network 2. In particular, each of the devices 10a to 10e and 20 may communicate with each other through a base station, but may directly communicate with each other without using a base station.

The AI server 20 may include a server that performs AI processing and a server that performs operations on big data.

The AI server 20 may be connected to at least one of the AI devices constituting the AI system 1, that is, the robot 10a, the self-driving vehicle 10b, the XR device 10c, the smartphone 10d, or the home appliance 10e through the cloud network 2, and may assist at least part of AI processing of the connected AI devices 10a to 10e.

At this time, the AI server 20 may learn the artificial neural network according to the machine learning algorithm instead of the AI devices 10a to 10e, and may directly store the learning model or transmit the learning model to the AI devices 10a to 10e.

At this time, the AI server 20 may receive input data from the AI devices 10a to 10e, may infer the result value for the received input data by using the learning model, may generate a response or a control command based on the inferred result value, and may transmit the response or the control command to the AI devices 10a to 10e.

Alternatively, the AI devices 10a to 10e may infer the result value for the input data by directly using the learning model, and may generate the response or the control command based on the inference result.

Hereinafter, various embodiments of the AI devices 10a to 10e to which the above-described technology is applied will be described. The AI devices 10a to 10e illustrated in FIG. 3 may be regarded as a specific embodiment of the AI device 10 illustrated in FIG. 1.

<AI+Robot>

The robot 10a, to which the AI technology is applied, may be implemented as a guide robot, a carrying robot, a cleaning robot, a wearable robot, an entertainment robot, a pet robot, an unmanned flying robot, or the like.

The robot 10a may include a robot control module for controlling the operation, and the robot control module may refer to a software module or a chip implementing the software module by hardware.

The robot 10a may acquire state information about the robot 10a by using sensor information acquired from various kinds of sensors, may detect (recognize) surrounding environment and objects, may generate map data, may determine the route and the travel plan, may determine the response to user interaction, or may determine the operation.

The robot 10a may use the sensor information acquired from at least one sensor among the lidar, the radar, and the camera so as to determine the travel route and the travel plan.

The robot 10a may perform the above-described operations by using the learning model composed of at least one artificial neural network. For example, the robot 10a may recognize the surrounding environment and the objects by using the learning model, and may determine the operation by using the recognized surrounding information or object information. The learning model may be learned directly from the robot 10a or may be learned from an external device such as the AI server 20.

At this time, the robot 10a may perform the operation by generating the result by directly using the learning model, but the sensor information may be transmitted to the external device such as the AI server 20 and the generated result may be received to perform the operation.

The robot 10a may use at least one of the map data, the object information detected from the sensor information, or the object information acquired from the external apparatus to determine the travel route and the travel plan, and may control the driving unit such that the robot 10a travels along the determined travel route and travel plan.

The map data may include object identification information about various objects arranged in the space in which the robot 10a moves. For example, the map data may include object identification information about fixed objects such as walls and doors and movable objects such as pollen and desks. The object identification information may include a name, a type, a distance, and a position.

In addition, the robot 10a may perform the operation or travel by controlling the driving unit based on the control/interaction of the user. At this time, the robot 10a may acquire the intention information of the interaction due to the user's operation or speech utterance, and may determine the response based on the acquired intention information, and may perform the operation.

<AI+Robot+Self-Driving>

The robot 10a, to which the AI technology and the self-driving technology are applied, may be implemented as a guide robot, a carrying robot, a cleaning robot, a wearable robot, an entertainment robot, a pet robot, an unmanned flying robot, or the like.

The robot 10a, to which the AI technology and the self-driving technology are applied, may refer to the robot itself having the self-driving function or the robot 10a interacting with the self-driving vehicle 10b.

The robot 10a having the self-driving function may collectively refer to a device that moves for itself along the given movement line without the user's control or moves for itself by determining the movement line by itself.

The robot 10a and the self-driving vehicle 10b having the self-driving function may use a common sensing method so as to determine at least one of the travel route or the travel plan. For example, the robot 10a and the self-driving vehicle 10b having the self-driving function may determine at least one of the travel route or the travel plan by using the information sensed through the lidar, the radar, and the camera.

The robot 10a that interacts with the self-driving vehicle 10b exists separately from the self-driving vehicle 10b and may perform operations interworking with the self-driving function of the self-driving vehicle 10b or interworking with the user who rides on the self-driving vehicle 10b.

At this time, the robot 10a interacting with the self-driving vehicle 10b may control or assist the self-driving function of the self-driving vehicle 10b by acquiring sensor information on behalf of the self-driving vehicle 10b and providing the sensor information to the self-driving vehicle 10b, or by acquiring sensor information, generating environment information or object information, and providing the information to the self-driving vehicle 10b.

Alternatively, the robot 10a interacting with the self-driving vehicle 10b may monitor the user boarding the self-driving vehicle 10b, or may control the function of the self-driving vehicle 10b through the interaction with the user. For example, when it is determined that the driver is in a drowsy state, the robot 10a may activate the self-driving function of the self-driving vehicle 10b or assist the control of the driving unit of the self-driving vehicle 10b. The function of the self-driving vehicle 10b controlled by the robot 10a may include not only the self-driving function but also the function provided by the navigation system or the audio system provided in the self-driving vehicle 10b.

Alternatively, the robot 10a that interacts with the self-driving vehicle 10b may provide information or assist the function to the self-driving vehicle 10b outside the self-driving vehicle 10b. For example, the robot 10a may provide traffic information including signal information and the like, such as a smart signal, to the self-driving vehicle 10b, and automatically connect an electric charger to a charging port by interacting with the self-driving vehicle 10b like an automatic electric charger of an electric vehicle.

FIG. 4 is an exploded perspective view of a robot according to an embodiment of the present disclosure.

A robot 10a according to the present embodiment may include a main body 200, a neck body 300, and a head 400.

The main body 200 may include a driving wheel 202 for driving the robot 10a. The driving wheel 202 may protrude downward from the main body 200.

In addition, casters 203 may be provided in the main body 200. The caster 203 may protrude downward from the main body 200 and assist the robot 10a in traveling.

The number and location of the driving wheel 202 and the casters 203 may vary as needed.

The main body 200 may be accommodated in housings 211 and 212. That is, the housings 211 and 212 may be skins surrounding the main body 200. The housings 211 and 212 may form the outer appearance of the robot 10a.

The housings 211 and 212 may include a front housing 211 and a rear housing 212. Therefore, fastening and separating work of the housings 211 and 212 may be facilitated.

The front housing 211 may be curved convexly forward, and the rear housing 212 may be curved convexly backward. The rear end of the front housing 211 and the front end of the rear housing 212 may come into contact with each other. Outer surfaces of the front housing 211 and the rear housing 212 may be continuously connected.

A lidar 204 may be provided in the main body 200. A recessed portion 211a in which the lidar 204 is disposed may be formed in the front housing 211. The recessed portion 211a may be recessed rearward from the front surface of the front housing 211. The recessed portion 211a may be opened forward and may be elongated in the left-and-right direction. The lidar 204 may detect an obstacle or a person located in front of the robot 10a through the recessed portion 211a.

In addition, a plurality of ultrasonic sensors (not shown) may be provided in the main body 200. The plurality of ultrasonic sensors may be spaced apart from each other in the circumferential direction of the main body 200. In more detail, a plurality of openings in which the ultrasonic sensors are disposed may be formed in outer circumferences of the housings 211 and 212. The ultrasonic sensors may detect an object around the robot 10a through the openings.

The main body 200 may be provided with a terminal 206 for charging the robot 10a. A through-hole through which the terminal 206 passes may be formed in the housing 210, more specifically, the front housing 211. The terminal 206 may protrude forward from the housing 210 through the through-hole.

The robot 10a may dock the terminal 206 to a charger (not shown), and the charger may charge a battery 270 built in the robot 10a through the terminal 206. The charger may be installed on an indoor wall or structure in which the robot 10a travels.

On the other hand, the neck body 300 may be elongated upward from the front portion of the main body 200. The neck body 300 may be formed vertically.

The head 400 may be provided at the upper end of the neck body 300. The head 400 may include a display 410. A preset image or video may be output on the display 410. In addition, the display 410 may include a touch panel.

FIG. 5 is a side view of the main body of the robot according to an embodiment of the present disclosure, FIG. 6 is a front view of the main body of the robot according to an embodiment of the present disclosure, and FIG. 7 is a bottom view of the main body of the robot according to an embodiment of the present disclosure.

The body 200 may include a base 230, a plurality of lower pillars 231 extending upward from the base 230, and an upper module 240 supported by the plurality of lower pillars 231.

The base 230 may be a horizontal plate. The driving wheel 202 and the casters 203 may be connected to the base 230.

The plurality of lower pillars 231 may extend vertically between the base 230 and the upper module 240. The plurality of lower pillars 231 may support the upper module 240 from the lower side. The plurality of lower pillars 231 may be spaced apart from each other, and the load of the upper module 240 may be uniformly distributed to the plurality of lower pillars 231.

The lower end of the lower pillar 231 may be fastened to the base 230, and the upper end of the lower pillar 231 may be fastened to the upper module 240, more specifically, a first plate 241 to be described below.

That is, the main body 200 may have a substantially flat plate structure. This has an effect of securing a wide inner space and reducing vibration.

The upper module 240 may be spaced upward from the base 230 and supported by the plurality of lower pillars 231. The neck body 300 may be connected to the upper module 240.

In more detail, the upper module 240 may include a plurality of plates 241 and 242 spaced apart from each other in a vertical direction, and a plurality of upper pillars 243 disposed between the plurality of plates 241 and 242. The plurality of plates 241 and 242 may be respectively disposed horizontally, and the plurality of upper pillars 243 may extend vertically.

The number of plates 241 and 242 and the vertical distance between the plurality of plates 241 and 353 may vary as needed. That is, the height and number of floors of the upper module 240 may vary according to the functions or roles required of the robot 10.

Hereinafter, a case where the plurality of plates 241 and 242 are a pair will be described as an example.

The pair of plates 241 and 242 may include a first plate 241 spaced upward apart from the base 230, and a second plate 241 spaced upward from the first plate 241. In this case, the plurality of upper pillars 243 may be located between the first plate 241 and the second plate 242 and may support the second plate 242 from the lower side. The lower end of the upper pillar 243 may be fastened to the first plate 241, and the upper end of the upper pillar 243 may be fastened to the second plate 242.

On the other hand, the main body 200 may further include at least one substrate 270 and a battery 280.

At least one substrate 270 may include a plurality of processors for operating the robot 10a. For example, a plurality of substrates 270 may be provided. The plurality of substrates 270 may include a main control board for controlling overall operations of the robot 10a and a power board electrically connected to the battery 280.

The battery 280 may supply power required for operations of the robot 10a. The battery 280 may be electrically connected to the terminal 206, and the battery 280 may be charged through the terminal 206.

The battery 280 may be located below the substrate 270. That is, since the relatively heavy battery 280 is located below the main body 200, the center of gravity of the main body 200 may be lowered and the robot may travel stably.

In more detail, the battery 280 may be located between the base 230 and the upper module 240. The base 230 may support the battery 280. In addition, the battery 280 may be located eccentrically to the rear. Therefore, the load of the battery 280 and the load of the neck body 300 and the head (see 400 of FIG. 4) may be balanced.

At least one substrate 270 may be disposed inside the upper module 240. For example, at least one substrate 270 may be located between the first plate 241 and the second plate 242.

On the other hand, the lidar 204 and the terminal 206 may be fastened to the base 230.

The lidar 204 and the terminal 206 may be mounted on the front portion of the base 230. In more detail, a lidar mounter 204a, to which the lidar 204 is mounted, and a charger 206a, from which the terminal 206 protrudes, may be fastened to the front portion of the base 230.

The lidar mounter 204a may be fastened to the upper surface of the base 230, and the lidar 204 may be spaced upward apart from the base 230 by the lidar mounter 204a. In addition, the lidar 204 may be located below the upper module 240.

The charger 206a may be located below the lidar mounter 204a. The terminal 206 may protrude forward from the charger 206a.

On the other hand, the main body 200 may further include a suspension 500 to which the driving wheel 202 is connected. The suspension 500 may be provided on at least one of the plurality of lower pillars 231. For example, the driving wheels 202 may be provided with a pair located on both sides of the base 230, and the suspension 500 may be provided with a pair to which a pair of driving wheels 202 are connected.

The suspension 202 may minimize vibration or shock transmitted to the main body 200 through the driving wheel 202. In more detail, the driving wheel 202 may move upward and downward due to the suspension 500. Therefore, even when the ground is uneven and bumpy, the driving wheel 202 may move upward and downward while maintaining contact with the ground. Therefore, the robot may travel stably with less shaking. A detailed configuration of the suspension 500 will be described below in detail.

A pair of cutouts 232 may be formed in the base 230 so as to prevent the driving wheel 202 and the suspension 500 from interfering with the base. The pair of cutouts 232 may be formed on both sides of the base 230.

The cutouts 232 may include a first cutout 233 where the driving wheel 202 is located and a second cutout 234 located inside the first cutout 233.

The second cutout 234 may prevent interference between the suspension 500 and the base 230 when the driving wheel 202 moves upward and downward. That is, the suspension 500 may protrude downward from the base 230 through the second cutout 234.

FIG. 8 is a view for describing the positions of the plurality of lower pillars and the plurality of upper pillars according to an embodiment of the present disclosure.

The body 200 may have a bilaterally symmetrical shape.

In more detail, with respect to an imaginary reference plane X1 crossing the center of the robot 10a back and forth, the base 230 and the plurality of plates 241 and 242 may have a symmetrical shape, and the plurality of lower pillars 231 and the plurality of upper pillars 234 may be symmetrically disposed. Accordingly, the center C of gravity of the robot 10a may be located on the reference plane X1.

The plurality of lower pillars 231 may be disposed closer to the edge of the base 230 than to the center of the base 230. Accordingly, a wide space is secured between the base 230 and the upper module 240, and a sufficiently large battery 280 may be disposed in the space. In addition, the load of the upper module 240 may be more efficiently distributed to the plurality of lower pillars 231.

For example, the plurality of lower pillars 231 may include a pair of first lower pillars 231a, a pair of second lower pillars 231b, a third lower pillar 231c, and a pair of fourth lower pillars 231d.

The pair of first lower pillars 231a may be located on both sides of the front of the base 230, and the pair of second lower pillars 231b may be located on both sides of the rear of the base 230. The pair of first lower pillars 231a and the pair of second lower pillars 231b may be located symmetrically with respect to the reference plane X1, and thus, he load of the upper module 240 may be widely distributed and stably supported.

The third lower pillar 231c may be located on the reference plane X1. The third lower pillar 231c may be located in the front center of the base 230. The third lower pillar 231c may intensively support the loads of the neck body 300 and the head 400.

The pair of fourth lower pillars 231d may be located at both sides of the center of the base 230 and may be located symmetrically with respect to the reference plane X1. The pair of fourth lower pillars 231d may not only support the load of the upper module 240, but also act as a suspension mounter where the suspension 500 is installed. This will be described in detail below.

The plurality of upper pillars 243 may be disposed closer to the edge of the first plate 241 than to the center of the first plate 241. Therefore, a wide space may be secured between the first plate 241 and the second plate 242. In addition, the load of the second plate 242 or an object placed on the second plate 242 may be more efficiently distributed to the plurality of upper pillars 243.

For example, the plurality of upper pillars 243 may include a pair of first upper pillars 243a, a pair of second upper pillars 243b, and a third upper pillar 243c.

The pair of first upper pillars 243a may be located on both sides of the front of the first plate 241, and the pair of second upper pillars 243b may be located on both sides of the rear of the first plate 241. The pair of first upper pillars 243a and the pair of second upper pillars 243b may be located symmetrically with respect to the reference plane X1, and the load of the first plate 242 and the object placed on the first plate 242 may be widely distributed and stably supported.

The third upper pillar 231c may be located on the reference plane X1. The third upper pillar 231c may be located at the front center of the first plate 241. The third upper pillar 243c may intensively support the loads of the neck body 300 and the head 400.

The plurality of lower pillars 231 and the plurality of upper pillars 243 may each include at least one pair of pillars arranged symmetrically with each other with respect to a vertical axis passing through the center C of gravity of the robot 10a or a point C1 adjacent to the center C of gravity. That is, the diagonal intersection between the plurality of lower pillars 231 and the diagonal intersection between the plurality of upper pillars 243 may not deviate greatly from the center C of gravity of the robot 10a.

For example, a diagonal line connecting the first lower pillar 231a located on one side of the reference plane X1 and the second lower pillar 231b located on the other side of the reference plane X1 may pass through the point C1 adjacent to the center C of gravity. In this case, a diagonal line connecting the first lower pillar 231a located on the other side of the reference plane X1 and the second lower pillar 231b located on one side of the reference plane X1 may pass through the point C1.

In addition, a diagonal line connecting the first upper pillar 243a located on one side of the reference plane X1 and the second upper pillar 243b located on the other side of the reference plane X1 may pass through the center C of gravity. In this case, a diagonal line connecting the first upper pillar 243a located on the other side of the reference plane X1 and the second upper pillar 243b located on one side of the reference plane X1 may pass through the center C of gravity.

Accordingly, rotational moment generated by vibration transmitted through the driving wheel 202 may be minimized, and the robot 10a may travel more stably.

On the other hand, the upper end of the lower pillar 231 may be adjacent to the lower end of the upper pillar 243. Therefore, the load may be easily transmitted to the upper pillar 243 and the lower pillar 231.

In more detail, the upper end of the first lower pillar 231a and the lower end of the first upper pillar 243a may be adjacent to each other. The upper end of the second lower pillar 231b and the lower end of the second upper pillar 243b may be adjacent to each other. The upper end of the third lower pillar 231c and the lower end of the third upper pillar 243c may be adjacent to each other.

FIG. 9 is a view illustrating the suspension according to an embodiment of the present disclosure, and FIG. 10 is a view of the suspension when viewed from the inside of the main body, according to an embodiment of the present disclosure.

The suspension 500 may be connected to at least one of the plurality of lower pillars 231. The suspension 500 may be provided with a pair to which the pair of driving wheels 200 are connected.

In more detail, the suspensions 500 may each include a slider 510, a spring 520, a suspension arm 530, and a connector 540.

The slider 510 may move upward and downward while sliding along the lower pillar 231, more specifically, the fourth lower pillar 231d. The slider 510 may be disposed to surround the outer circumference of the lower pillar 231.

The spring 520 may be disposed on the outer circumference of the lower pillar 231, more specifically, the fourth lower pillar 231d, and may press the slider 510 downward. The spring 520 may surround the outer circumference of the fourth lower pillar 231d, may be located above the slider 510, and may be vertically tensioned.

In more detail, a spring connector 521 to which the spring 520 is connected may be provided at the upper end of the fourth lower pillar 231d. The spring connector 521 may come into contact with the lower surface of the upper module 240, more specifically, the first plate 241. The upper end of the spring 520 may be connected to the spring connector 521, and the lower end of the spring 520 may be connected to the slider 510. The spring 520 may be compressed or tensioned between the spring connector 521 and the slider 510. The spring 520 may act as a damper that cancels vibration transmitted from the driving wheel 202.

The suspension arm 530 may be connected to the slider 510 and the driving wheel 202. The slider 510 may be located on one side of the suspension arm 530, and the driving wheel 202 may be located on the other side of the suspension arm 530.

In addition, the suspension arm 530 may move the slider 510 and the driving wheel 202 upward and downward while rotating with respect to the connector 540.

In more detail, an elongated hole (see 535 of FIG. 14) may be formed in the suspension arm 530 in one direction (e.g., in the front-and-rear direction), and a protruding pin 511 inserted into the elongated hole 535 may be formed in the slider 510.

As the slider 510 moves upward and downward, the protruding pin 511 may move between both ends of the elongated hole 535. Accordingly, the rotational motion of the suspension arm 530 may be converted into the vertical motion of the slider 510.

In addition, a through hole (see 536 of FIG. 14) through which a rotational shaft 206 of the driving wheel 202 passes may be formed in the suspension arm 530. Accordingly, the driving wheel 202 may be rotatably connected to the suspension arm 530. The through-hole 536 may be formed below the elongated hole 535.

In more detail, the suspension arm 530 may include a body portion 531 connected to the slider 510 and the driving wheel 202, and an arm portion 534 extending from the body portion 531 and connected to the connector 540.

The body portion 531 may be located between the slider 510 and the driving wheel 202. The elongated hole (see 535 of FIG. 14) and the through-hole 536 described above may be formed in the body portion 531.

The arm portion 534 may extend toward the connector 540 from above the body portion 531. The arm portion 534 may be rotatably connected to the connector 540.

The arm portion 534 may extend in an inclined direction in which a height decreases as the distance from the body portion 531 increases. Accordingly, even when the suspension arm 530 rotates downward, the arm portion 534 may be located above the base 230. Therefore, the suspension arm 530 may smoothly rotate without interfering with the base 230.

The suspension arm 530, more specifically, the body portion 531 may protrude downward from the base 230 through a second cutout (see 234 of FIG. 7) formed in the base 230.

The connector 540 may be fastened to the base 230, and the rotational shaft of the suspension arm 530 may be connected thereto.

In more detail, the connector 540 may include a pair of fastening portions 541 spaced apart from each other with the suspension arm 530 disposed therebetween, and a connecting pin 542 connecting the pair of fastening portions 541 and passing through the suspension arm 530.

The pair of fastening portions 541 may be fastened to the upper surface of the base 230. The pair of fastening portions 541 may be spaced apart from each other with the end of the arm portion 534 disposed therebetween.

The connecting pin 542 may pass through the end of the arm portion 534 and connect the pair of fastening portions 541 to each other. The connecting pin 542 may constitute the rotational shaft of the suspension arm 530. A connecting hole (see 534a of FIG. 11) through which the connecting pin 542 passes may be formed at the end of the suspension arm 530, more specifically, the arm portion 534.

FIGS. 11 to 13 are views for describing the connection between the suspension arm and the driving wheel according to an embodiment of the present disclosure.

The driving wheel 202 may include a wheel body 204 and a friction member 205 surrounding the wheel body 204.

The wheel body 204 may have a substantially disk shape. A motor (not shown) may be built in the wheel body 204. That is, the driving wheel 202 may be rotated by an in-wheel motor.

The friction member 205 may come into contact with the bottom surface. The friction member 205 may act as a tire and may have a material (e.g., rubber) having a high friction coefficient.

The rotational shaft 206 of the driving wheel 202 may protrude from the center of the wheel body 204. The rotational shaft 206 of the driving wheel 202 may pass through the through-hole 536 formed in the suspension arm 230, more specifically, the body portion 531, and may rotate within the through-hole 536.

Constraining portions 207 and 208 for constraining the suspension arm 530 in the direction of the rotational shaft 206 with respect to the suspension arm 530 may be provided on the rotational shaft 206 of the driving wheel 202.

In more detail, the constraining portions 207 and 208 may include a flange 207 located on one side of the suspension arm 530 and a fastening member 208 located on the other side of the suspension arm 530. The fastening member 208 may be a nut.

That is, the suspension arm 530 may be constrained between the flange 207 and the fastening member 208. Therefore, it is possible to prevent the driving wheel 202 from shaking in the direction of the rotational shaft 206 with respect to the suspension arm 530.

A first recessed portion 537 in which at least a portion of the flange 207 is located may be formed on one surface of the suspension arm 530, and a second recessed portion 538 in which at least a portion of the fastening member 208 is located may be formed on the other surface of the suspension arm 530. One surface on which the first recessed portion 537 is formed may face the driving wheel 202, and the other surface on which the second recessed portion 538 is formed may be located on the opposite side of the one surface. In this case, the through-hole 536 through which the rotational shaft 206 of the driving wheel 202 passes may penetrate from the first recessed portion 537 to the second recessed portion 538. That is, like the through-hole 536, the first recessed portion 537 and the second recessed portion 538 may be formed in the body portion 531.

A stepped portion 539 may be formed on the inner circumference of the second recessed portion 538 in a radially inward direction. The stepped portion 539 may be similar to an under-cut structure. In addition, the fastening member 208 may be provided with an expansion portion 209 constrained to the stepped portion 539 in the direction of the rotational shaft 206 of the driving wheel 202.

The expansion portion 209 may extend from the outer circumference of the fastening member 208 in a radially outward direction. The diameter of the expansion portion 209 may be less than or equal to the inner diameter of the second recessed portion 538. The expansion portion 209 may be caught on the stepped portion 539 in the direction of the rotational shaft 206 of the driving wheel 202. Therefore, it is possible to prevent the fastening member 208 from being separated from the second recessed portion 538.

On the other hand, the suspension arm 530 may include a plurality of parts 532 and 533 fastened to each other. Hereinafter, a case where the suspension arm 530 includes a pair of parts 532 and 533 coupled to each other will be described as an example.

A portion of each of the first recessed portion 537, the second recessed portion 538, and the through-hole 539 may be formed in one part 532 among the pair of parts 532 and 533. In addition, another portion of each of the first recessed portion 537, the second recessed portion 538, and the through-hole 539 may be formed in the other part 532 among the pair of parts 532 and 533.

Therefore, connection and separation between the rotational shaft 206 of the driving wheel 202 and the suspension arm 530 may be facilitated.

For example, the plurality of parts 532 and 533 may include an upper part 532 and a lower part 533 fastened so as to be divided vertically. The upper part 532 may include a portion of the body portion 531 and an arm portion 534. The lower part 534 may include another portion of the body portion 531. The upper part 532 and the lower part 534 may be fastened to each other by at least one fastening member 539 such as a screw.

FIGS. 14 to 16 are views for describing the operation of the suspension according to the embodiment of the present disclosure.

As illustrated in FIG. 14, the driving wheel 202 may travel on a flat floor surface G while maintaining a normal height. In this case, the vertical distance H1 from the base 230 to the contact point between the driving wheel 202 and the floor surface G may be equal to or similar to the vertical distance from the base 230 to the contact point between the caster 203 and the floor surface G.

As illustrated in FIG. 15, the driving wheel 202 may move downward in a normal state and maintain contact with the bottom surface G1 that is stepped or recessed downward. In this case, the vertical distance H2 from the base 230 to the contact point between the driving wheel 202 and the floor surface G1 may be greater than the vertical distance from the base 230 to the contact point between the caster 203 and the floor surface G.

As illustrated in FIG. 16, the driving wheel 202 may move upward in a normal state and maintain contact with the floor surface G2 or an obstacle that is stepped or protrudes upward. In this case, the vertical distance H3 from the base 230 to the contact point between the driving wheel 202 and the floor surface G2 may be less than the vertical distance from the base 230 to the contact point between the caster 203 and the floor surface G.

In more detail, the driving wheel 202 may move upward between a first position P1 in which the rotational shaft 206 of the driving wheel 202 is located below the base 230 and a second position P2 in which the rotational shaft 206 of the driving wheel 202 is located above the base 230.

When the driving wheel 202 is in the first position P1, the vertical length of the spring 520 may be greater than half of the vertical length of the lower pillar 231, and the protruding pin 511 of the slider 510 may be located at one end of the elongated hole 535 of the suspension arm 530. In addition, the suspension arm 530 may rotate downward with respect to the connector 540 as the center. In this case, the suspension arm 530, more specifically, the body portion 531 may protrude downward from the base 530 through a second cutout (see 234 of FIG. 7) formed in the base 230.

When the driving wheel 202 is in the second position P2, the vertical length of the spring 520 may be less than half of the vertical length of the lower pillar 231, and the protruding pin 511 of the slider 510 may be located at the other end of the elongated hole 535 of the suspension arm 530. In addition, the suspension arm 530 may rotate upward with respect to the connector 540 as the center. In this case, the suspension arm 530, more specifically, the body portion 531 may move upward from the base 530 through the second cutout (see 234 of FIG. 7) formed in the base 230.

Since the suspension 500 is directly installed on the lower pillar 231 instead of a separate shaft, a sufficiently long stroke of the suspension 500 may be secured. Therefore, the robot 10a may easily travel even with respect to the floor or the obstacle having a slightly large step.

The above description is merely illustrative of the technical spirit of the present disclosure, and various modifications and changes can be made by those of ordinary skill in the art, without departing from the scope of the present disclosure.

Therefore, the embodiments disclosed in the present disclosure are not intended to limit the technical spirit of the present disclosure, but are intended to explain the technical spirit of the present disclosure. The scope of the technical spirit of the present disclosure is not limited by these embodiments.

The scope of the present disclosure should be interpreted by the appended claims, and all technical ideas within the scope equivalent thereto should be construed as falling within the scope of the present disclosure.

What is claimed is:

1. A robot comprising:
   a base;
   a driving wheel protruding downward from the base;
   a plurality of lower pillars extending upward from the base;
   an upper module supported by the plurality of lower pillars; and
   a suspension coupled to at least one lower pillar of the plurality of lower pillars and further coupled to the driving wheel,
   wherein the suspension comprises:
      a slider configured to move upward and downward while sliding along the at least one lower pillar;
      a spring disposed relative to an outer circumference of the at least one lower pillar and being positioned to provide a force that causes the slider to move downward;
      a suspension arm coupled to the slider and a rotational shaft of the driving wheel;
      a connector coupled to the base; and
      a rotational shaft of the suspension arm being coupled to the connector.

2. The robot of claim 1, wherein the driving wheel moves upward and downward between a first position at which the rotational shaft of the driving wheel is located below the base and a second position at which the rotational shaft of the driving wheel is located above the base.

3. The robot of claim 2, wherein a vertical length of the spring is greater than half of a vertical length of the at least one lower pillar when the driving wheel is in the first position, and
   wherein the vertical length of the spring is less than half of the vertical length of the at least one lower pillar when the driving wheel is in the second position.

4. The robot of claim 1, wherein the base is shaped to define a cutout to prevent interference between the suspension and the base when the driving wheel moves upward and downward.

5. The robot of claim 1, wherein the slider is located on one side of the suspension arm, and the driving wheel is located on another side of the suspension arm.

6. The robot of claim 1, wherein the suspension arm comprises:
   a body portion to which the slider and the driving wheel are coupled; and
   an arm portion extending from the body portion and being coupled to the connector.

7. The robot of claim 6, wherein the arm portion extends in an oblique direction relative to the body portion such that a height of the arm portion decreases as a distance from the body portion increases.

8. The robot of claim 1, wherein the suspension arm is shaped to define an elongated hole that is formed in one direction in the suspension arm, and
   wherein the slider includes a protruding pin inserted into the elongated hole and moving between both ends of the elongated hole when the slider moves upward and downward.

9. The robot of claim 1, wherein the suspension arm is shaped to include:
   a first recessed portion facing the driving wheel;
   a second recessed portion located on an opposite side of the first recessed portion; and
   a through-hole penetrating from the first recessed portion to the second recessed portion and through which the rotational shaft of the driving wheel passes, and
   wherein the rotational shaft of the driving wheel comprises:
      a flange, at least a portion of which is located within the first recessed portion; and
      a fastening member, at least a portion of which is located within the second recessed portion.

10. The robot of claim 9, wherein the suspension arm comprises a pair of parts fastened to each other,
    wherein a portion of each of the first recessed portion, the second recessed portion, and the through-hole is formed in one of the pair of parts, and
    wherein another portion of each of the first recessed portion, the second recessed portion, and the through-hole is formed in another of the pair of parts.

11. The robot of claim 9, wherein a stepped portion is formed on an inner circumference of the second recessed portion in a radially inward direction, and
    wherein the fastening member includes an expansion portion constrained to the stepped portion with respect to a direction of the rotational shaft of the driving wheel.

12. The robot of claim 1, further comprising a battery disposed between the base and the upper module.

13. The robot of claim 1, wherein the plurality of lower pillars comprise at least one pair of pillars disposed symmetrically with each other with respect to a vertical axis passing through a center of gravity of the robot or a point adjacent to the center of gravity of the robot.

14. The robot of claim 1, wherein the plurality of lower pillars are disposed closer to an edge of the base than a center of the base.

15. The robot of claim 1, wherein the upper module comprises:
    a plurality of plates spaced in parallel to each other in a vertical direction; and a plurality of upper pillars disposed between the plurality of plates.

16. The robot of claim 15, wherein the plurality of lower pillars and the plurality of upper pillars comprise at least one pair of pillars disposed symmetrically with each other with respect to a vertical axis passing through a center of gravity of the robot or a point adjacent to the center of gravity of the robot.

17. The robot of claim 15, wherein the plurality of lower pillars are disposed closer to an edge of the base than a center of the base, and
   wherein the plurality of upper pillars are disposed closer to an edge of the plurality of plates than to a center of each of the plurality of plates.

18. The robot of claim 15, wherein upper ends of the plurality of lower pillars are adjacent to lower ends of the plurality of upper pillars.

19. The robot of claim 15, further comprising:
   a battery disposed between the base and the upper module; and
   at least one substrate disposed inside the upper module.

* * * * *